(12) United States Patent
Kuchipudi et al.

(10) Patent No.: US 8,712,712 B2
(45) Date of Patent: Apr. 29, 2014

(54) SYSTEM AND METHOD FOR PRODUCING STATISTICALLY VALID ASSAY MEANS AND RANGES FOR QUALITY CONTROL MATERIALS

(75) Inventors: Lakshmi Samyukta Kuchipudi, Irving, TX (US); Curtis Alan Parvin, McKinney, TX (US); John Christopher Yundt-Pacheco, Fairview, TX (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 377 days.

(21) Appl. No.: 13/074,649

(22) Filed: Mar. 29, 2011

(65) Prior Publication Data

US 2012/0253723 A1    Oct. 4, 2012

(51) Int. Cl.
*G01N 33/00* (2006.01)
*G06F 17/18* (2006.01)

(52) U.S. Cl.
USPC ............. 702/83; 702/81; 702/84; 702/179; 700/109

(58) Field of Classification Search
USPC ......................................... 702/83
See application file for complete search history.

(56) References Cited

U.S. PATENT DOCUMENTS

| 6,278,401 | B1 | 8/2001 | Wigren | |
| 6,821,792 | B1 * | 11/2004 | Sonderman et al. | 438/5 |
| 7,312,083 | B2 | 12/2007 | Middleton | |
| 7,467,054 | B2 * | 12/2008 | Yundt-Pacheco | 702/84 |
| 2004/0220761 | A1 | 11/2004 | Yundt-Pacheco | |

OTHER PUBLICATIONS

International Search Report and Written Opinion of PCT/US12/30709 mailed on Jun. 20, 2012, 8 pages.

\* cited by examiner

*Primary Examiner* — Andrew Schechter
*Assistant Examiner* — Terence Stifter, Jr.
(74) *Attorney, Agent, or Firm* — Kilpatrick Townsend & Stockton LLP (57) ABSTRACT

A method of establishing statistically valid assay means and ranges for quality control materials, used to qualify medical testing machines, utilizes tests on a new lot of quality control material to establish an assay mean, and uses data from a database of historical test results to establish an assay range. The system may estimate the variability of test results from prior lot data, and then compute the limits of the assay range such that a new test on a new lot of the quality control material will be expected to fall within the range with a specified probability. Because historical data is used to estimate the test variability, the number of new tests required to specify a statistically valid mean and range may be dramatically reduced, as compared with establishing the mean and range based only on tests of the new lot of material.

21 Claims, 5 Drawing Sheets

FIG. 5

SYSTEM AND METHOD FOR PRODUCING STATISTICALLY VALID ASSAY MEANS AND RANGES FOR QUALITY CONTROL MATERIALS

BACKGROUND OF THE INVENTION

Certain medical tests have become highly automated. For example common tests such as measuring a patient's cholesterol levels or blood sugar, testing for the presence of drugs in a subject's blood or urine, or measuring other aspects of a patient's blood chemistry can now be performed by automated testing machines at rates up to thousands of tests per hour. In a typical test, a sample such as a quantity of a patient's blood is reacted with a reagent, and the resulting product studied to determine the presence or amount of a particular analyte in the sample. The reagent may be specifically designed for the performance of the particular test.

Because important medical decisions may be made on the basis of the test results, it is highly desirable that the testing machines be qualified periodically to maintain confidence that the machines are operating properly, or to try to detect when the machines are not operating properly. In fact, U.S. government regulations require such periodic validation. By regulation, each testing machine must be qualified at least once per day for any day that patient testing is performed.

Qualification may involve testing a sample having known characteristics, and checking whether the machine produces a test result that agrees with the known characteristics. If so, the machine may be assumed to be operating properly, and if not, the operation of the machine may be suspect.

Machine qualification thus requires the ready availability of test samples having known characteristics. These test samples used for machine qualification may be called "quality control materials". Because a single testing machine may be able to perform a large number of different tests, including testing for an analyte using different reagents, and because testing machines from different manufacturers may perform tests differently, the number of quality control materials that must be readily available is very large, in order to qualify every kind of machine in the performance of every test it is capable of. For at least some tests, for example tests that test for unusual conditions in human tissue or unstable analytes, it may be impracticable to maintain a reserve of actual biological samples having known characteristics, so the quality control material may mimic the behavior of an actual biological sample. Quality control materials are preferably stabilized, so that they can be stored for long periods. For example, some quality control materials are lyophilized at the time of manufacture, and reconstituted for use.

Because of natural variability in the process of manufacturing quality control materials, each new lot of a particular quality control material is characterized at the time of its manufacture, to determine a range of test result values within which a result from a test of a sample from the lot is expected, with a specified probability, to fall when the quality control material is tested using a testing instrument that is operating properly. A mean value is also typically published. These means and ranges, known as assay means and ranges, are published for the use of testing laboratories in the qualification of their machines. Means and ranges may be published for each possible combination of testing machine model and quality control material, or testing method and quality control material.

Recent guidance from the U.S. Food and Drug Administration requires that published assay means and ranges for quality control materials be statistically valid.

BRIEF SUMMARY OF THE INVENTION

According to one aspect, a method of establishing a statistically valid assay mean and assay range for a particular lot of a quality control material comprises testing a number of samples from the particular lot of the quality control material and obtaining a test result from each sample, and computing a mean of the test results. The uncertainty in the estimate of the mean is also computed. The method further comprises accessing a database of historical test results obtained from tests performed on prior lots of the quality control material, and computing at least in part from the historical test results a variability estimate that is an estimate of the variability of test results obtained from tests performed on at least one prior lot of the quality control material. A target probability is specified, which a new qualification test result performed on a sample of the new lot of quality control material will fall within the assay range. The method further comprises computing, based at least in part on the mean, the uncertainty in the estimate of the mean, and the variability estimate, a range of test result values within which a result from a qualification test of a sample from the particular lot of the quality control material is expected to fall, with the target probability. The method may further comprise testing the samples from the particular lot of the quality control material to obtain the test results. The method may further comprise outputting the range. In some embodiments, computing the variability estimate comprises computing at least in part from the historical test results an estimate of the uncertainty of the mean, computing at least in part from the historical test results a within-instrument variability estimate that is an estimate of the variability of test results obtained using a single testing instrument on at least one prior lot of the quality control material, and computing at least in part from the historical test results a between-instrument variability estimate that is an estimate of the variability of test results obtained using different testing instruments on at least one prior lot of the quality control material; and computing the range based at least in part on the mean and the variability estimate comprises computing the range based at least in part on the mean, the estimate of the uncertainty of the mean, the within-instrument variability estimate, and the between-instrument variability estimate. In some embodiments, the method further comprises setting an upper limit for the percentage of the assay range that is due to uncertainty in estimating the mean, and establishing a sampling plan, based at least in part on the within- and between-instrument variability estimates, to achieve an assay range having a percentage of its width due to uncertainty in estimating the mean, the percentage being at or below the upper limit. In some embodiments, the within-instrument variability estimate is derived from an average of variances, each variance being the variance of test results from a respective one of a plurality of instruments. In some embodiments, the between-instrument variability estimate is derived from a variance of averages, each average being an average test result from a respective one of a plurality of instruments. In some embodiments, the estimate of the uncertainty of the mean is a standard error of the mean, and the standard error of the mean is computed based at least in part on estimates of variability derived from the database of historical test results. In some embodiments, computing the variability estimate at least in part from the historical test results comprises accounting for an observed relationship between the mean and the variability of test results. In some embodiments, computing the variability estimate at least in part from the historical test results comprises performing a regression using the historical test results to characterize the relationship between the mean and at least one component of the variability, and adjusting the variability estimate based on the mean and the relationship. In some embodiments, computing the variability estimate at least in part from the historical test results comprises identifying a specific prior lot of the quality control material that has a mean test result comparable to the mean computed from the test results from the particular lot of quality control material, computing a variability of test results obtained from tests of the specific prior lot of quality control material, and assigning to the particular lot of quality control material a variability estimate that is equal to the computed variability of test results from the specific prior lot of quality control material. In some embodiments, computing the variability estimate comprises computing at least in part from the historical test results an estimate of the uncertainty of the mean, computing at least in part from the historical test results a within-laboratory variability estimate that is an estimate of the variability of test results obtained within a single laboratory on at least one prior lot of the quality control material, and computing at least in part from the historical test results a between-laboratory variability estimate that is an estimate of the variability of test results obtained from different laboratories on at least one prior lot of the quality control material; and computing the range based at least in part on the mean and the variability estimate comprises computing the range based at least in part on the mean, the estimate of the uncertainty of the mean, the within-laboratory variability estimate, and the between-laboratory variability estimate. The method may further comprise removing from consideration anomalous test results found in the database of historical test results.

According to another aspect, a method of establishing a sampling plan for assigning an assay mean and range to a particular lot of a quality control material comprises setting an upper limit for the percentage of the assay range that is due to uncertainty in estimating the mean, and accessing a database of historical test results obtained from tests performed on prior lots of the quality control material. A within-instrument variability estimate is computed at least in part from the historical test results, and is an estimate of the variability of test results obtained using a single testing instrument on at least one prior lot of the quality control material. A between-instrument variability estimate is computed at least in part from the historical test results, and is an estimate of the variability of test results obtained using different testing instruments on at least one prior lot of the quality control material. The method further comprises establishing a sampling plan, based at least in part on the within- and between-instrument variability estimates, to achieve an assay range having a percentage of its width due to uncertainty in estimating the mean, the percentage being at or below the upper limit.

According to another aspect, a system for establishing a statistically valid assay mean and assay range for a particular lot of a quality control material comprises a processor, a database holding historical test results obtained from tests performed on prior lots of the quality control material, and a memory readable by the processor. The memory holds processor instructions that when executed by the processor cause the system to obtain a number of test results obtained from tests on a number of samples from the particular lot of the quality control material, compute a mean of the test results, and access the database of historical test results obtained from tests performed on prior lots of the quality control material. The instructions further cause the system to compute at least in part from the historical test results a variability estimate that is an estimate of the variability of test results obtained from tests performed on at least one prior lot of the quality control material, and receive a specification of a target probability with which a new qualification test result performed on a sample of the new lot of quality control material will fall within the assay range. The instructions further cause the system to compute, based at least in part on the mean and the variability estimate, a range of test result values within which a result from a qualification test of a sample from the particular lot of the quality control material is expected to fall, with the target probability. In some embodiments, the instructions, when executed by the processor to compute the variability estimate, further cause the processor to compute at least in part from the historical test results an estimate of the uncertainty of the mean; compute at least in part from the historical test results a within-instrument variability estimate that is an estimate of the variability of test results obtained using a single testing instrument on at least one prior lot of the quality control material; and compute at least in part from the historical test results a between-instrument variability estimate that is an estimate of the variability of test results obtained using different testing instruments on at least one prior lot of the quality control material.

According to another aspect, an assay mean and range assignment system for establishing a statistically valid assay mean and assay range for a particular lot of a quality control material comprises a database holding historical test results obtained from tests performed on prior lots of a quality control material, and a mean determination module that receives a number of test results obtained from tests on a number of samples from a new lot of the quality control material and computes a mean of the test results. The system further comprises a variability estimation module that computes at least in part from the historical test results a variability estimate that is an estimate of the variability of test results obtained from tests performed on at least one prior lot of the quality control material, and a range establishment module that establishes, based at least in part on the mean and the variability estimate, a range of test result values within which a result from a qualification test of a sample from the new lot of the quality control material is expected to fall, with a target probability. In some embodiments, the the variability estimate comprises a within-instrument variability estimate that is an estimate of the variability of test results obtained using a single testing instrument on at least one prior lot of the quality control material; and the variability estimate comprises a between-instrument variability estimate that is an estimate of the variability of test results obtained using different testing instruments on at least one prior lot of the quality control material; and the system further comprises a sampling plan establishment module that establishes a sampling plan based at least in part on the within-instrument variability estimate and the between-instrument variability estimate. In some embodiments, the sampling plan establishment module receives a specification of an upper limit for the percentage of the assay range that is due to uncertainty in estimating the mean, and establishes the sampling plan based at least in part on the within-instrument variability estimate, the between-instrument variability estimate, and the upper limit for the percentage of the assay range that is due to uncertainty in estimating the mean. The range establishment module may account for an observed relationship between the mean and variability of historical test results. In some embodiments, the variability estimate comprises an estimate the uncertainty of the mean; the variability estimate comprises a within-instrument variability estimate that is an estimate of the variability of test results obtained using a single testing instrument on at least one prior lot of the quality control material; the variability estimate comprises a between-instrument variability estimate that is an estimate of the variability of test results obtained using different testing instruments on at least one prior lot of the quality control material; and the range establishment module establishes the range based at least in part on the mean, the estimate of the uncertainty of the mean, the within-instrument variability estimate, and the between-instrument variability estimate.

DETAILED DESCRIPTION OF THE INVENTION

Table 1 below is an extract of an example table of assay means and ranges, as may be published by a manufacturer of quality control materials.

TABLE 1

Example Assay Means and Ranges

|  |  |  | Level 1 | | Level 2 | |
| --- | --- | --- | --- | --- | --- | --- |
| Analyte | | Units | Mean | Range | Mean | Range |
| Instrument | | | | | | |
| Brand A Model X | Glucose | mg/dL | 92 | 82-102 | 270 | 253-287 |
| Brand A Model X | Cholesterol (Tot) | mg/dL | 253 | 214-293 | 129 | 99-159 |
| Brand B Model Y | Glucose | mg/dL | 89 | 75-103 | 288 | 242-334 |
| Brand B Model Y | Cholesterol (Tot) | mg/dL | 268 | 230-305 | 128 | 110-146 |
| Method | | | | | | |
| Method A | Glucose | mg/dL | 87.4 | 73.4-101 | 274 | 230-318 |
| Method B | Cholesterol (Tot) | mg/dL | 286 | 229-343 | 141 | 113-169 |
| Method C | Glucose | mg/dL | 89 | 74.8-103 | 277 | 222-321 |
| Method D | Cholesterol (Tot) | mg/dL | 262 | 225-298 | 128 | 110-145 |

The first part of Table 1 is organized according to particular tests performed on particular testing instruments. In the "Instrument" section of Table 1, there are eight sets of means and ranges given—two kinds of tests (glucose and cholesterol) performed on two different models of testing machine (Brand A model X and Brand B model Y), and for two different concentrations of analyte in the quality control materials (Level 1 and Level 2). For example, an owner of a Brand B Model Y testing machine may refer to the third line of the table to determine the range within which a test result would be expected to fall for a qualification test performed with the quality control material for which the table is produced. According to the third line of the table, a user of a Brand B Model Y testing machine may expect a test of the particular Level 1 quality control material for testing glucose to produce a test result between 75 and 103 mg/dL, with a confidence established by the statistical methods used to assign the range. In some embodiments, the range may be established such that the machine user would expect the test result to fall within the specified range about 99.7% of the time when the testing machine being qualified is operating properly. A test result outside the range may therefore raise a doubt about whether the machine is operating properly or the quality control material has been compromised, prompting further investigation.

The "Method" part of Table 1 is organized according to testing method. A laboratory using a testing machine that is not represented in the "Instrument" section of the table may use the "Method" section to determine the expected range for qualification tests according to the method used by its particular testing machine.

The abbreviated listing of Table 1 includes 16 different mean and range entries. For the purposes of this disclosure, each entry will be said to correspond to a "test condition", which may be a particular combination of factors such as testing machine make and model, analyte, reagent, quality control material, quality control material concentration, and test method. A complete table may include entries for many different test conditions, encompassing dozens of different testing machine models and dozens of different tests to be performed by any of several different methods. A single product line of quality control materials may require that assay means and ranges be characterized at over 1,500 test conditions. A manufacturer of quality control materials must establish each of those means and ranges by statistically valid methods, and the means and ranges must be re-established for each new lot of each quality control material.

One technique for establishing the means and ranges would be to simply, for each new lot of a particular quality control material, perform tests on samples of the new lot on several different testing machines in several different laboratories, and to statistically characterize the results. However, this approach may be very expensive, as many tests of each material/machine combination may be needed to account for several sources of uncertainty in the testing process.

For example, as is well known, estimating a mean of a population by sampling involves uncertainty, as different sample sets will yield different estimates for the population mean. This uncertainty is often expressed as a "standard error of the mean", which is one estimate of the uncertainty in the mean.

Other sources of uncertainty arise as well. Repeated tests on a single testing machine will vary somewhat. This variation is referred to as "within-instrument" variability. Additionally, tests performed using different testing machines of the same make and model will vary. This variation is referred to as "between-instrument" variability. And tests performed in different laboratories using testing machines of the same make and model will vary. This variation will be referred to as "between-laboratory" variability. In some embodiments, it may be assumed that between-instrument and between-laboratory variabilities are interchangeable terms. This assumption would be perfectly valid, for example, if each laboratory used only one instrument of any particular make and model. In practice, any error introduced by equating between-instrument and between-laboratory variability may be negligible. For example, all results from a particular laboratory for a particular machine make and model may be assumed to be performed on the same testing instrument.

If mean and range values were to be assigned based only on tests of a new lot of the material, multiple tests would be performed using each of multiple testing machines at multiple laboratories, and enough test results would be collected to account for uncertainty in establishing the mean, for within-instrument variability, and for between-instrument or between-laboratory variability. This approach may require a large number of tests for statistical validity, to establish the range with confidence.

Embodiments of the invention exploit two observations to dramatically reduce the number of tests that must be performed to establish statistically valid means and ranges for new quality control material lots. First, it is observed that a sample mean may be estimated using a relatively small number of samples, as compared with the number of samples required to estimate the sample variability with similar confidence. Second, it has also been realized that while the mean test result expected from a particular quality control material varies between lots (resulting in the need to reassign means and ranges for each new lot), the variability of the test results tends to remain relatively stable between lots.

Embodiments of the invention establish the assay means for a new lot of quality control material using tests performed on the new lot of material, but utilize the database of historical test results derived from prior lots to establish the assay ranges, which may be based on the uncertainty in the estimate of the mean, the within-instrument variability, and the between-instrument or between-laboratory variability. Thus, relatively few new tests must be performed to establish the assay means and ranges for the new lot of material. In some embodiments, the estimates of variability may be further adjusted based on the newly-established assay mean. The assay mean and range can then be specified for each test condition.

Historical Results

Nearly every qualification test performed on the many testing machines by the many testing laboratories throughout the world is recorded, and the results communicated back to the manufacturer of the quality control material used in the qualification test. These qualification test results are accumulated in a database of historical results, and may be used in various ways by the quality control material manufacturer. Such a database may include millions of individual qualification test results, spanning years of data gathering. Each recorded record typically indicates the test condition at which the result was taken, and may include such information as the laboratory where the qualification test was run, the type of quality control material used in the test, the make and model of testing instrument on which the qualification test was run, the analyte being tested, the reagent used, the test method used, and the test result. Other kinds of information could be included as well. The database may therefore contain the results of many tests performed using prior lots of each quality control material at each test condition of interest.

Example Assay Mean Computation

In some embodiments, the assay mean is computed as an average of test results obtained from tests of the new lot of quality control material, performed under like test conditions. The like test conditions may include using testing machines of like make and model in the different laboratories, for example. In some cases, tests performed on a single testing instrument may be sufficient. The mean may be computed as follows:

Let $Y_{ij}$ be the $j^{th}$ test result reported by the $i^{th}$ lab, $i=1, \ldots, L$, $j=1, \ldots, n_i$ and $n_i$ is the number of reported results for each reporting lab. Note that it is not necessary that all of the laboratories perform the same number of tests.

Let $\overline{Y}_i$ be the mean of the reported results for the $i^{th}$ lab.

$$\overline{Y}_i = \sum_{j=1}^{n_i} \frac{Y_{ij}}{n_i}$$

The assay mean is computed as the average of all the lab means:

$$\text{Mean} = \frac{1}{L} \sum_{i=1}^{L} \overline{Y}_i$$

Example Within-Instrument (Lab) Variability Computation

According to embodiments, the within-instrument variability is estimated using historical data from qualification tests performed on prior lots of the particular quality control material, across multiple testing machines, which likely reside in multiple laboratories.

Depending on the make and model of testing machine corresponding to the test condition of interest, there may be many test results, possibly many thousands of results, in the database that are usable for estimating the within-instrument variability. In some embodiments, the within-instrument variability may be computed as an average variance of test results obtained from individual testing machines (an average of variabilities), or otherwise derived from the variances of test results from the individual testing machines. The estimate may be corrected for bias. The within-instrument variability estimate may be computed as follows:

For each reporting lab, compute the sum of the reported results:

$$S_i = \sum_{j=1}^{n_i} Y_{ij}$$

For each reporting lab, compute the sum of reported results squared:

$$SS_i = \sum_{j=1}^{n_i} Y_{ij}^2$$

Compute the sum of all reported results from all laboratories:

$$S = \sum_{i=1}^{L} S_i$$

Compute the total number of reported results from all laboratories:

$$N = \sum_{i=1}^{L} n_i$$

From the above quantities, compute the sum square within, $$SS_W = \sum_{i=1}^{L} SS_i - \sum_{i=1}^{L} \frac{S_i^2}{n_i}$$

and compute the within-lab variance, $V_W = SS_W/(N-L)$

The within-lab standard deviation can then be computed as $SD_W = \sqrt{V_W}$.

Note that these computations make the assumption that all results from a particular laboratory are obtained using the same instrument. Of course, separate instruments could be tracked separately. The within lab standard deviation $SD_W$ is an example of an estimate of within-instrument or within-laboratory variability. As is explained in more detail below, the estimate may be further adjusted based on the mean determined above before computing the limits of the assay range.

Example Between-Instrument (Laboratory) Variability Computation

According to embodiments, the between-instrument variability is also estimated using historical data from qualification tests performed on prior lots of the particular quality control material, across multiple testing machines, which likely reside in multiple laboratories. Each particular testing machine may produce results that differ from results obtained from other machines of like make and model. The differences may result from differences in calibration or operational techniques. Depending on the make and model of testing machine corresponding to the test condition of interest, there may be many laboratories, possibly hundreds, that use the testing machine, and whose qualification test results are in the historical database and are usable for estimating the between-instrument variability. In some embodiments, the between-instrument variability may be computed as a variability between average test results obtained from different individual testing machines (a variability of averages). The between-instrument variability estimate may be computed as follows, utilizing the quantities $S_i$, $SS_i$, and N defined above:

Compute sum square between:

$$SS_B = \sum_{i=1}^{L} \frac{S_i^2}{n_i} - \frac{S^2}{N}$$

Compute $$n_B = \frac{1}{L-1}\left(N - \frac{\sum_{i=1}^{L} n_i^2}{N}\right)$$

Compute between-lab variance $$V_B = \text{Max}\left(0, \frac{SS_B/(L-1) - V_W}{n_B}\right)$$

Compute between-lab standard deviation, $SD_B = \sqrt{V_B}$.

The between-laboratory standard deviation $SD_B$ is an example of an estimate of between-laboratory or between-instrument variability. As is explained in more detail below, the estimate may be further adjusted based on the mean determined above before computing the limits of the assay range.

On the assumption that the within- and between-instrument variabilities are the two sources of variation that contribute to the total variability $SD_T$, then $SD_T = \sqrt{SD_W^2 + SD_B^2}$.

Adjustment of Variability Estimates Based on Mean

In some embodiments, the estimates of within-instrument, between-instrument, and total variability may be adjusted before proceeding further. For example, it has been observed that the within-instrument variability, such as $SD_W$, varies as a function of the mean test result for the particular quality control material of interest. (The mean test result will vary as a function of the concentration of the analyte in the quality control material, which varies between lots.) In one hypothetical scenario, a first lot of the particular quality control material may produce slightly higher mean test results than a second lot, and the results may also vary more within a particular testing instrument for the first lot than for the second. That is, in this hypothetical example, within-instrument variability is positively correlated with the mean test result. Because the estimate of the mean computed for a new lot of the quality control material may differ from the average of the means from prior lots, it may be desirable to adjust the variability estimates, in accordance with the observed relationship of variability and mean.

To characterize the relationship of mean and variability, a regression analysis may be performed on data from the database of historical test results, for each test condition of interest. Once the relationship is known, the variability estimates may be adjusted. Preferably, separate correlations and adjustments are performed for the separate within-instrument, between-instrument, and total variability estimates. If regression analysis is performed to establish the relationship between mean and variability for any two of the three variabilities (within-instrument, between-instrument, and total), then the third relationship can be established directly from the equation relating total variability to between-instrument and within-instrument variability.

Other techniques may be utilized for accounting for an observed relationship between variability and mean test result. For example, another way to establish the variability estimate would be to identify, in the database of historical test results, a specific prior lot of the quality control material that has a mean test result comparable to the mean test result computed for the new lot of quality control material. In this embodiment, the variability of test results from the specific prior lot is computed, and the variability estimate for the new lot of quality control material is then assigned to be equal to the computed variability of test results from the specific prior lot of quality control material. Whether the mean of a prior lot is comparable to the mean computed for the new lot of material may be established in any suitable way. For example, a prior lot may be considered to have a comparable mean if its mean is within 1%, 2%, 5%, or another suitable percentage of the mean of test results from the new lot. Or a prior lot may be considered to have a comparable mean if its mean is within the standard error of the mean computed for the new lot of quality control material, as described below.

Example Error of the Mean Estimation

The range of test results within which a new test result, resulting from a test performed on any instrument in any laboratory, is expected to fall is widened by several factors, including the uncertainty of determining the sample mean, the within-instrument variability, and the between-instrument variability. The uncertainty in the estimate of the mean depends on the number of instruments and samples used to compute the estimate of the sample mean, and on the between-instrument and within-instrument variability. In embodiments of the invention, very few samples may be used to estimate the assay mean, for example as few as four samples. If the estimate of the standard error of the mean were to be computed based on the same small number of samples, the assay range may be undesirably unreliable.

Thus according to embodiments of the invention, the uncertainty in the estimate of the mean is computed using variability data from the database of historical results, because a much larger sample size is available with which to estimate the variability. In some embodiments, the standard error of the mean is used as the uncertainty estimate of the mean, according to $$SEM = \sqrt{\frac{V_B}{L} + \frac{V_W}{L^2} \sum_{i=1}^{L} \frac{1}{n_i}}.$$

In this formula for the standard error of the mean (SEM), the terms $V_W$ and $V_B$ are the within- and between-instrument or between-laboratory variances computed above, L is the number of laboratories, and $n_i$ is the number of reported results for each reporting lab used to estimate the new quality control lot mean.

Example Assay Range Determination

Once the error of the mean and the within- and between-instrument variabilities have been estimated, the assay range can be determined. The expected distribution of test results, taken using any testing instrument in any laboratory, will be centered on the assay mean, and have a width that is influenced by the uncertainty in the estimate of the mean, as well as the within- and between-instrument variabilities. Using the estimates computed above, a standard deviation of the distribution of expected test results may be computed as:

$$SD_R = \sqrt{SD_B^2 + SD_W^2 + SEM^2}.$$

For the purposes of this disclosure, an estimate of population variability including the estimate of the standard error of the mean and the within- and between-instrument variability estimates will be referred to as an estimate of the "overall" variability (which is different than the "total" variability discussed above). $SD_R$ as computed above is an example of an overall variability estimate. The assignment of the assay range is then made to encompass a specified portion of the expected test result distribution. For example, if it is desired that the assay range encompass 99.7% of all expected test results from testing machines operating under statistical control, the range may be set at Mean$\pm 3*SD_R$. In that case, then a test on a sample of the new lot of quality control material would be expected to fall within the specified range with probability of 99.7%, regardless of which instrument is used to perform the test, and regardless of which laboratory the instrument resides in. In another example, if it is desired that the assay range encompass 95.4% of all expected test results, the range may be set at Mean$\pm 2*SD_R$, in which case a test on a sample of the new lot of quality control material would be expected to fall within the specified range with a probability of 95.4%, for any normally-operating test instrument in any lab.

Curation of Data

Preferably, all of the data used in the determination of assay means and ranges, including the data in the database of historical results and the results of tests performed on a new lot of quality control material, is "curated" before use. That is, the data is examined and clearly erroneous or anomalous data is either corrected or removed from consideration.

Anomalous data may arise from many causes. For example, different laboratories report their qualification test results to the quality control material manufacturers in different ways. Some testing machines may be automated and connected to a computer network, so that qualification test results are transmitted automatically and electronically with little opportunity for human error, although collection and transmission errors are possible. Some laboratories may record qualification test results manually, so that many other opportunities for error are present. For example, digits may be transposed or mistyped, or the units of measure for a particular test may be entered incorrectly. In the latter case, a test whose results are properly reported in milligrams per liter could mistakenly be reported in grams per liter, so that the reported results differ from the actual results by a factor of 1000. Many, many other error sources are possible.

It is important, however, not to remove data that are likely to be within the normal distribution of test results, but merely in the tails of the distribution. Examples of criteria by which a test result may be excluded include:

test result is outside the range of possible results for the test of interest;

test result differs from the average test result by more than a specified number of standard deviations of the population of similar tests, for example four, five, or six standard deviations;

test result is a negative number for a quantity that can only be measured in positive numbers;

test result exceeds the average result of similar tests by more than a specified factor, for example a factor of 100 or more; or reported units of a test result are inconsistent with the nature of the test itself.

Many other criteria for excluding data may be envisioned and used within the scope of the appended claims. In some embodiments, data may not be excluded automatically, but an automated system may flag suspicious data for review by a skilled operator, who may then decide which data are to be excluded, if any.

Sampling Plan Specification

The database of historical test results may be exploited for other uses as well. For example, as is explained above, the uncertainty in the estimate of the mean is influenced by the number of samples tested to establish the assay mean, the within-instrument variability, and the between-instrument (laboratory) variability. It is desirable that the error of the mean contribute only a small portion of the width of the assay range, for example no more than 12% of the range width. However, without prior knowledge of the within- and between-instrument variabilities, it is difficult or impossible to know how the assay range width will be influenced by tests conducted on different instruments and at different laboratories. If the number of samples used to establish the assay mean and the allocation of tests to different testing instruments and laboratories are chosen blindly at the beginning of a mean and range assignment process, it may be discovered at the end of the process that the range is unnecessarily wide due to an excessive contribution from the uncertainty in the mean.

The database of historical test results can be utilized for designing a sampling plan, to minimize the number of tests that must be done in order to establish an assay mean and range for which the uncertainty in the mean contributes an acceptably small portion of the assay range. For example, if it is known a priori that for a particular test condition, the between-instrument or between-laboratory variability is very small in relation to the within-instrument variability, it may be possible to establish the assay mean using tests conducted on only a single testing machine, as tests conducted on other machines would likely merely duplicate those of the first machine. However, if the between-instrument variability is large in relation to the within-instrument variability, it would be very important to test using multiple machines, to account for the between-instrument variability. In this case, relatively few tests may be required on each machine, as a small within-instrument variability indicates that such tests may quickly become redundant. When the within- and between-instrument variabilities are closely balanced, then it may be necessary to perform multiple tests on each of several testing instruments.

Table 2 below illustrates the effect on a sampling plan of different relationships of within- and between instrument variabilities. The effects are given in terms of the ratio k of the between-lab (instrument) variability to the within-lab (instrument) variability, that is $k=SD_B/SD_W$, and the portion of the assay range that is attributable to the error of the mean for different sampling plans. As can be seen from Table 2, if the between-lab variability is very small in relation to the within-lab variability (k=0.1), it may be necessary to test only on a single instrument to establish the mean with sufficient confidence that only a small portion of the assay range will be attributable to the uncertainty in the mean. Using a 12% contribution as an example, it can be seen that in the "k=0.1" column of Table 2, that four or more tests performed on a single testing machine are sufficient. Alternatively, if two or three instruments are used, then two or more tests on each machine are sufficient, and if four instruments are used, then only one test on each machine is needed.

If k=2, then at least four testing machines would have to be utilized to achieve a 12% or less contribution to the assay range width, as can be seen in the "k=2" column of Table 2.

If k=0.5, then any of several sampling plans may suffice, including four or more tests on each to two instruments, two or more tests on each of three instruments, or one or more tests on each of four instruments.

By estimating $SD_B$ and $SD_W$ beforehand using the historical test data, a tester may be able to safely design an efficient sampling plan for the determination of a new assay range.

TABLE 2

% Increase in Range due to Uncertainty of Mean Estimate

| # Labs | # Reps in Lab | # of Data Points | Between-Lab SD is 1/10 as Large as Within-Lab SD (k = 0.1) | Between-Lab SD is 1/2 as Large as Within-Lab SD (k = 0.5) | Between-Lab SD Equals Within-Lab SD (k = 1) | Between-Lab SD is 2 Times Larger Than Within-Lab SD (k = 2) |
|---|---|---|---|---|---|---|
| 1 | 1 | 1 | 41% | 41% | 41% | 41% |
| 1 | 2 | 2 | 23% | 26% | 32% | 38% |
| 1 | 3 | 3 | 16% | 21% | 29% | 37% |
| 1 | 4 | 4 | 12% | 18% | 27% | 36% |
| 1 | 5 | 5 | 10% | 17% | 26% | 36% |
| 1 | 6 | 6 | 8% | 15% | 26% | 35% |
| 1 | 7 | 7 | 7% | 15% | 25% | 35% |
| 1 | 8 | 8 | 6% | 14% | 25% | 35% |
| 1 | 9 | 9 | 6% | 14% | 25% | 35% |
| 1 | 10 | 10 | 5% | 13% | 24% | 35% |
| 2 | 1 | 2 | 22% | 22% | 22% | 22% |
| 2 | 2 | 4 | 12% | 14% | 17% | 20% |
| 2 | 3 | 6 | 8% | 11% | 15% | 20% |
| 2 | 4 | 8 | 6% | 10% | 15% | 19% |
| 2 | 5 | 10 | 5% | 9% | 14% | 19% |
| 2 | 6 | 12 | 4% | 8% | 14% | 19% |
| 2 | 7 | 14 | 4% | 8% | 13% | 19% |
| 2 | 8 | 16 | 3% | 7% | 13% | 19% |
| 2 | 9 | 18 | 3% | 7% | 13% | 19% |
| 2 | 10 | 20 | 3% | 7% | 13% | 19% |
| 3 | 1 | 3 | 15% | 15% | 15% | 15% |
| 3 | 2 | 6 | 8% | 10% | 12% | 14% |
| 3 | 3 | 9 | 6% | 7% | 11% | 14% |
| 3 | 4 | 12 | 4% | 6% | 10% | 13% |
| 3 | 5 | 15 | 3% | 6% | 10% | 13% |
| 3 | 6 | 18 | 3% | 5% | 9% | 13% |
| 3 | 7 | 21 | 2% | 5% | 9% | 13% |
| 3 | 8 | 24 | 2% | 5% | 9% | 13% |
| 3 | 9 | 27 | 2% | 5% | 9% | 13% |
| 3 | 10 | 30 | 2% | 5% | 9% | 13% |
| 4 | 1 | 4 | 12% | 12% | 12% | 12% |
| 4 | 2 | 8 | 6% | 7% | 9% | 11% |
| 4 | 3 | 12 | 4% | 6% | 8% | 10% |
| 4 | 4 | 16 | 3% | 5% | 8% | 10% |
| 4 | 5 | 20 | 3% | 4% | 7% | 10% |
| 4 | 6 | 24 | 2% | 4% | 7% | 10% |
| 4 | 7 | 28 | 2% | 4% | 7% | 10% |
| 4 | 8 | 32 | 2% | 4% | 7% | 10% |
| 4 | 9 | 36 | 1% | 4% | 7% | 10% |
| 4 | 10 | 40 | 1% | 3% | 7% | 10% |

Figure 1:
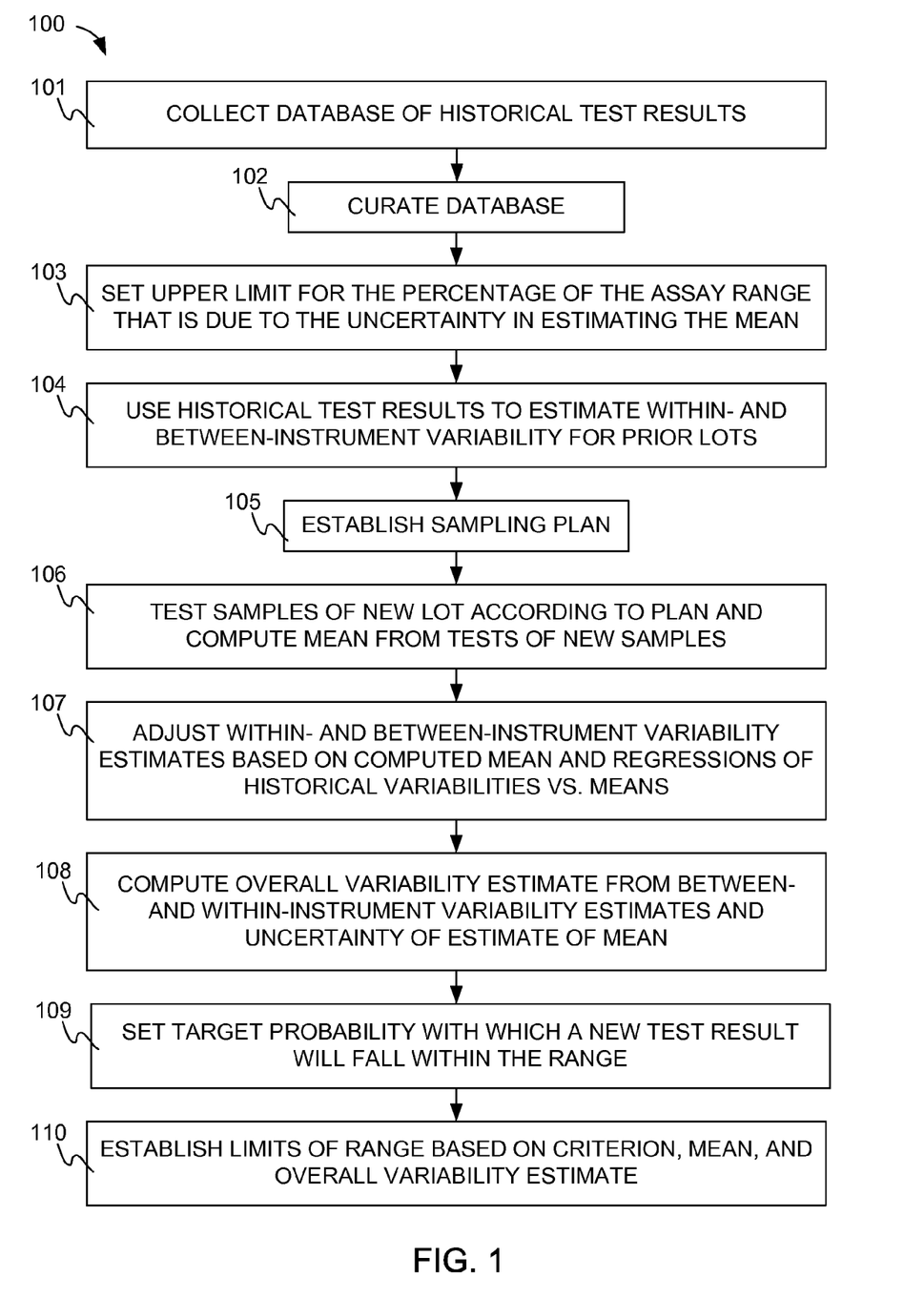
FIG. 1 illustrates in flowchart form an overview of steps of a method for establishing a statistically valid assay mean and assay range for a particular lot of a quality control material, in accordance with embodiments of the invention.

FIG. 1 illustrates in flowchart form an overview of steps of a method 100 for establishing a statistically valid assay mean and assay range for a particular lot of a quality control material, in accordance with embodiments of the invention. It will be recognized that some steps illustrated in FIG. 1 are optional or may not be performed in some embodiments. In addition, the order of steps may be rearranged when appropriate. While the flow chart of FIG. 1 is shown as sequential, some steps may be performed in parallel with other steps.

In step 101, the database of historical test results is collected, as described above. That is, testing laboratories record and report the results of qualification tests, and report the results along with information identifying the test condition for each result. The results may be reported to the manufacturer of the quality control material used in each qualification test. In step 102, the data in the database is curated to remove clearly erroneous or anomalous entries. The database preferably includes the results of many qualification tests, encompassing prior lots of the quality control material for which a new mean and assay range are desired.

In step 103, an upper limit is set for the percentage of the assay range that will be due to the uncertainty in estimating the mean. In some embodiments, this limit may be set at 6%, 8%, 10%, 12%, 15%, 20%, 25%, or another suitable value. The limit may be selected by the entity performing the method, and may be selected arbitrarily, or for reasons chosen by the entity establishing the limit.

In step 104, the database of historical results is accessed and used to estimate the within- and between-instrument variabilities of prior lots of the quality control material. As is explained above, the variability estimates may be expressed as standard deviations $SD_W$ and $SD_B$. Other kinds of variability estimates may be used in embodiments, for example maximum likelihood or restricted maximum likelihood estimates of variances.

In step 105, a sampling plan is determined, based at least in part on the within- and between-instrument variability estimates. The sampling plan may indicate how many samples of the new lot of quality control material need be tested on how many different testing machines in order that the mean can be estimated precisely enough that the uncertainty in the mean contributes no more to the width of the assay range than the upper limit set in step 103. If the estimates of within- and between-instrument variability are expressed as standard deviations $SD_W$ and $SD_B$, Table 2 may be used to establish the sampling plan.

In step 106, samples are tested of the new lot of quality control material for which a new assay mean and range are desired. The samples may be tested according to the sampling plan established in step 105.

In step 107, the estimates of between- and within-instrument variability may be adjusted based on the mean computed in step 106, according to historical relationships between variabilities and means for the test condition of interest. For example, regressions may be performed on data from the database of historical results, to establish the expected relationships between the mean and the within-instrument variability and between the mean and the between-instrument variability.

In step 108, an estimate of the overall variability is computed from the within- and between-instrument variability estimates, and an estimate of the uncertainty in the mean. As is explained above, the standard error of the mean may be used as the estimate of the uncertainty in the mean. The standard deviation $SD_R$ may be used as the estimate of the overall variability, although embodiments of the invention may use other reassures of overall variability.

In step 109, a target probability is set for the probability that a new qualification test result, performed on a properly-functioning testing machine in a laboratory that is operating under statistical control, will fall within the assay range to be established. For example, the target probability may be set at 75%, 80%, 90%, 95.4%, 99%, 99.7%, 99.9%, or any other suitable value.

And in step 110, the limits of the assay range are established. Preferably, the range is centered on the calculated mean, and has a width such that new qualification test results will fall within the range with the target probability established in step 109. When the overall variability is estimated using a standard deviation $SD_R$, the range may be established using the number of standard deviations that are required to encompass the desired proportion of qualification test results.

At least steps 104-110 may be repeated for each new test condition of interest, for example a new combination of testing instrument make and model, test method, particular quality control material, and quality control material concentration.

Figure 2:
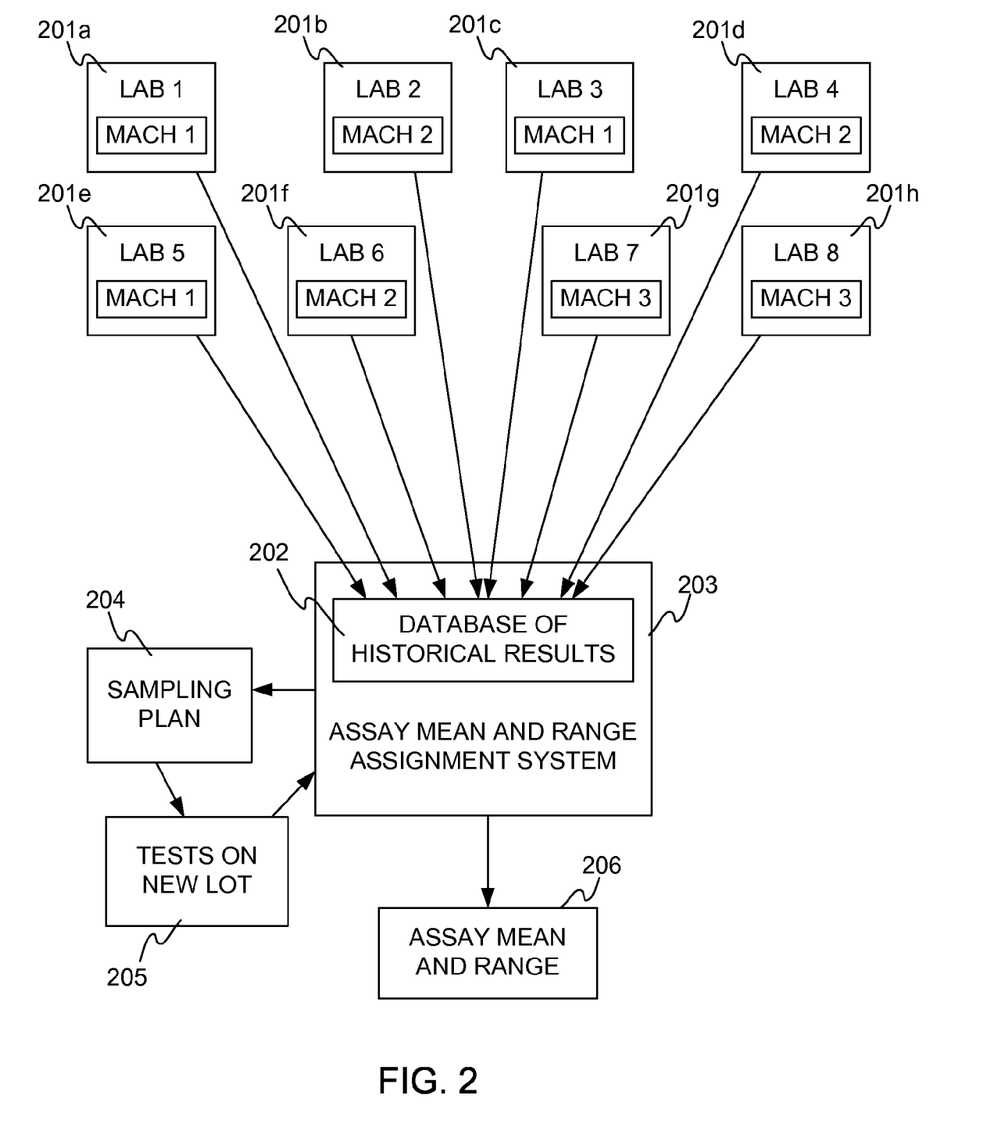
FIG. 2 illustrates a simplified block diagram of the interactions of various systems involved in the assignment of assay means and ranges, in accordance with embodiments of the invention.

FIG. 2 illustrates a simplified block diagram of the interactions of various systems involved in the assignment of assay means and ranges, in accordance with embodiments of the invention. A number of laboratories 201a-h record the results of qualification tests. Those results are collected in a database of historical results 202, and may be curated as described above. In FIG. 2, eight laboratories utilizing three different testing machine models are depicted, but it will be recognized that many more laboratories and testing machine models may be present. An assay mean and range assignment system 203 accesses the database 202, and performs the calculations for assigning the mean and range. Assay mean and range assignment system 203 may first utilize data from database 202 to formulate a sampling plan 204, and samples of a new lot of quality control material may be tested 205 in accordance with the sampling plan. The results of those tests are communicated back to assay mean and range assignment system 203, which computes and outputs the assay mean and range 206.

Figure 3:
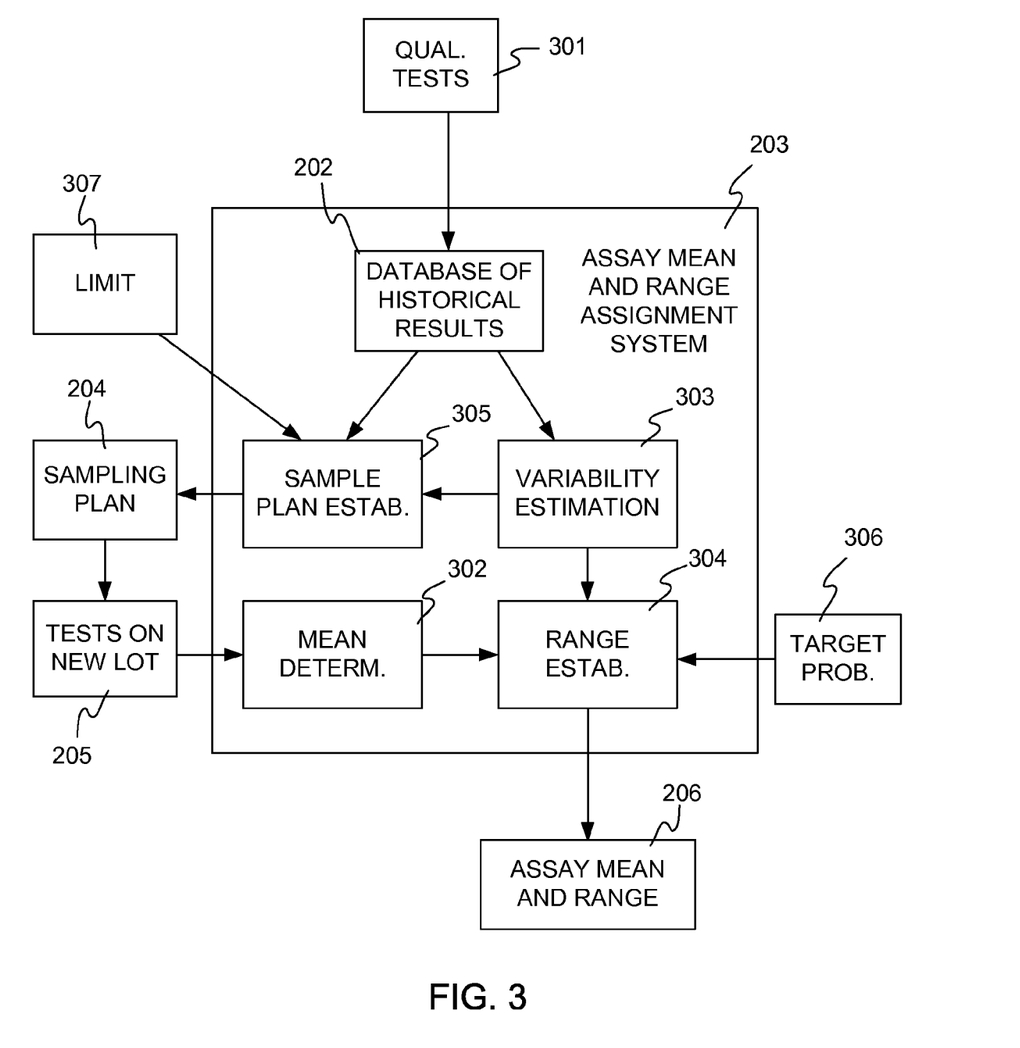
FIG. 3 illustrates a system according to embodiments of the invention.

FIG. 3 illustrates assay mean and range assignment system 203 in more detail. Assay mean and range assignment system 203 includes database 202, which receives results from qualification tests 301 performed on a number of different testing instruments, as described above. The system further includes a mean determination module 302 that receives the results of tests performed on samples of the new lot of quality control material and computes the mean of the test results. System 203 also includes a variability estimation module 303 that computes an estimate of the variability of test results obtained from tests performed on at least one prior lot of the quality control material, using data from database 202. A range establishment module 304 receives the mean and the variability estimate, and also a target probability 306 with which a new qualification test result performed on a sample of the new lot of quality control material should fall within the assay range, and computes the assay mean and range 206. System 203 may also include a sample plan establishment module 305 that formulates sampling plan 204 based on data from database 202 and one or more other inputs, for example a specification 307 of an upper limit for the percentage of the assay range that is due to uncertainty in estimating the mean. Modules 302-305 may be implemented in hardware, software, firmware, or a combination of these, for example using a computer system as described in more detail below.

Figure 4:
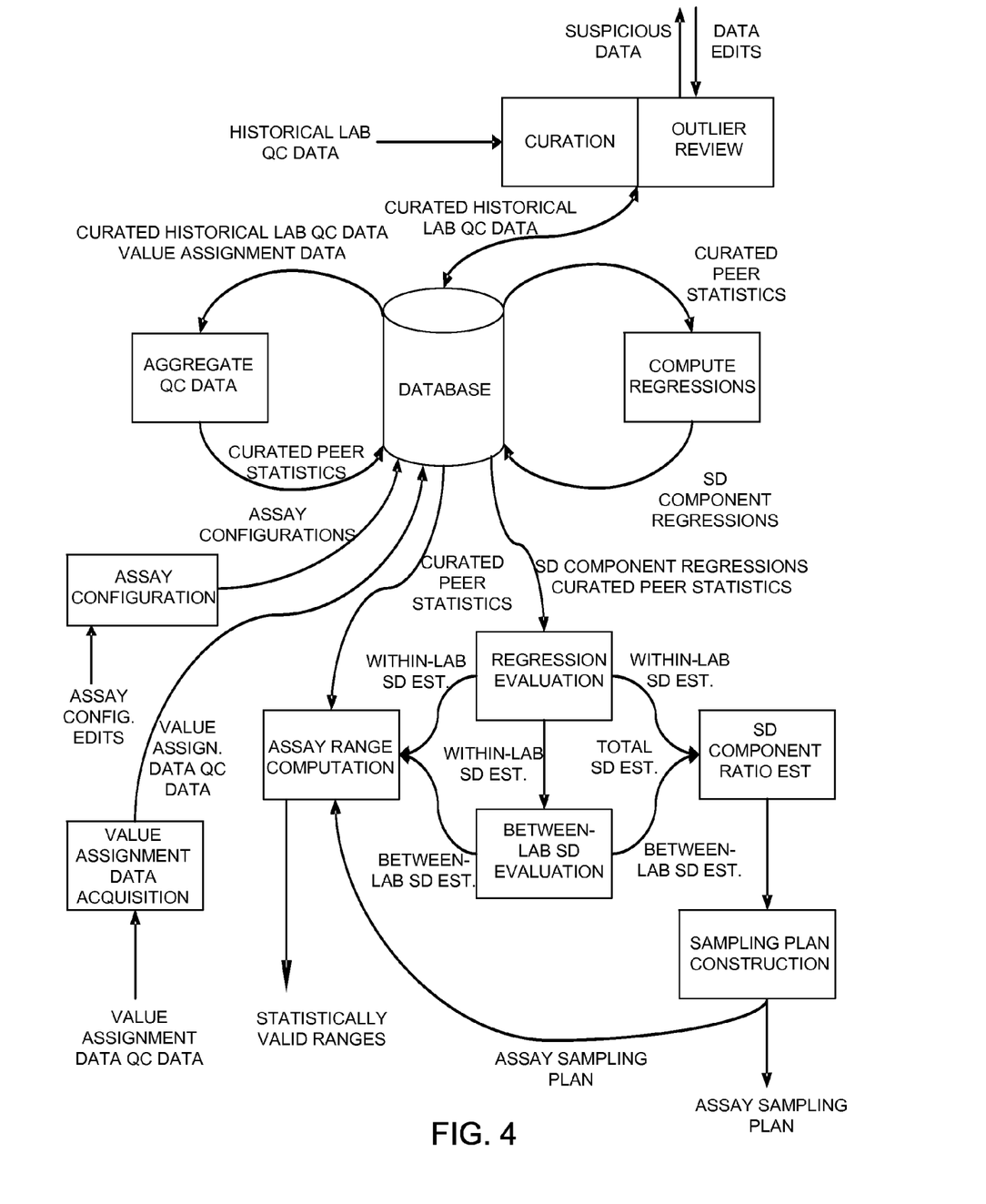
FIG. 4 illustrates in more detail data flows involved in the assignment of assay means and ranges, in accordance with embodiments of the invention.

A more detailed description of various data flows, in accordance with embodiments, is shown in FIG. 4. For the purposes of this disclosure, "peer" data from the database are data that can be used in establishing an assay mean and range for a particular test condition.

Figure 5:
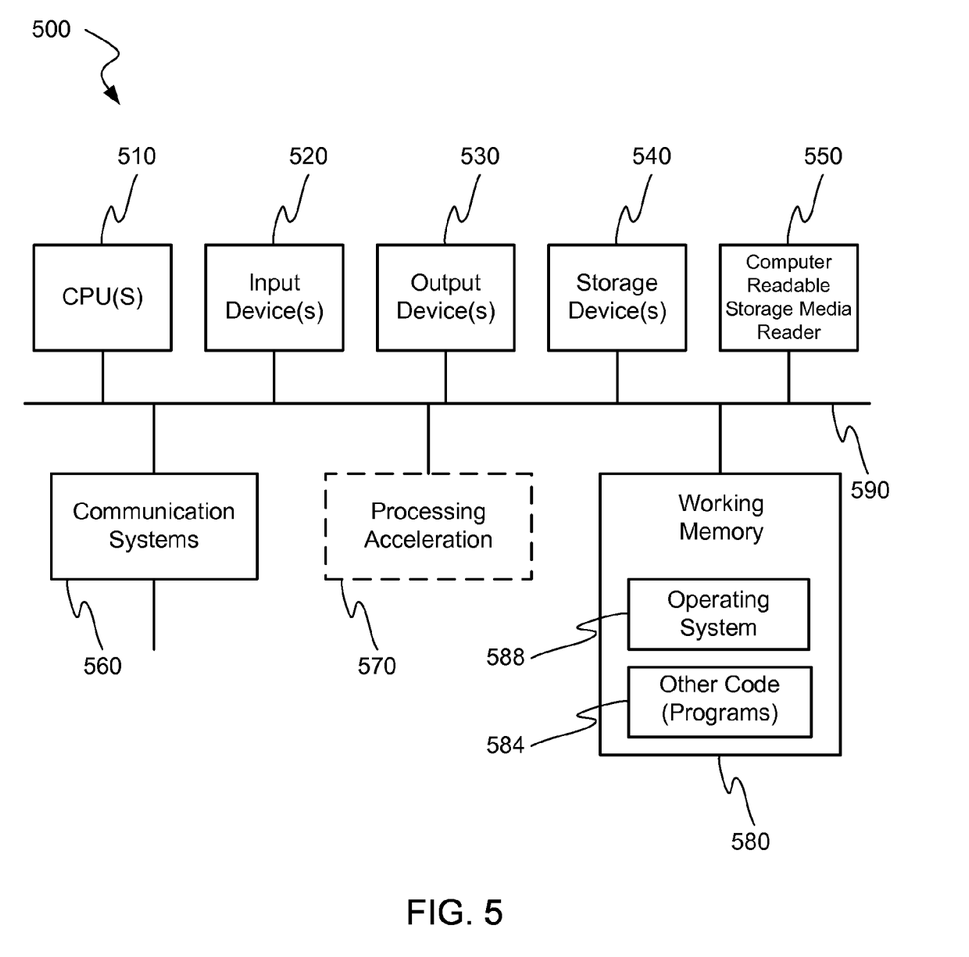
FIG. 5 is a block diagram illustrating an exemplary computer system in which embodiments of the present invention may be implemented.

FIG. 5 is a block diagram illustrating an exemplary computer system 500 in which embodiments of the present invention may be implemented. This example illustrates a computer system 500 such as may be used, in whole, in part, or with various modifications, to provide the functions of assay mean and range assignment system 203 and/or other components of the invention. For example, various functions of assay mean and range assignment system 203 may be controlled or performed by computer system 500, including, merely by way of example, the estimation of the within- and between-instrument variabilities, the computation of the mean and the uncertainty in the estimate of the mean, regressions and the adjustment of the within- and between-instrument variability estimates, the computation of an overall variability estimate, and the computation of the assay range.

Computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). Computer system 500 may also include one or more storage devices 540. By way of example, storage device(s) 540 may be disk drives, optical storage devices, solid-state storage device such as a random access memory ("RAM") and/or a read-only memory ("ROM"), which can be programmable, flash-updateable and/or the like.

Computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, computer system 500 may also include a processing acceleration unit 570, which can include a digital signal processor, a special-purpose processor and/or the like.

Computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. Communications system 560 may permit data to be exchanged with a network, system, computer and/or other component described above.

Computer system 500 may also comprise software elements, shown as being currently located within a working memory 580, including an operating system 584 and/or other code 588. It will be appreciated that alternate embodiments of computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of assay mean and range assignment system 203 and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method of establishing a statistically valid assay mean and assay range for a particular lot of a quality control material, the method comprising:
   testing a number of samples from the particular lot of the quality control material and recording the results of the tests;
   computing a mean of the test results;
   accessing, from a computer storage device, a database of historical test results obtained from tests performed on prior lots of the quality control material;
   computing, using a computer system specially programmed to do so, at least in part from the historical test results a variability estimate that is an estimate of the variability of test results obtained from tests performed on at least one prior lot of the quality control material;
   specifying a target probability with which a new qualification test result performed on a sample of the new lot of quality control material will fall within the assay range; and
   computing, using the specially-programmed computer system, based at least in part on the mean and the variability estimate, a range of test result values within which a result from a qualification test of a sample from the particular lot of the quality control material is expected to fall, with the target probability.

2. The method of claim 1, further comprising outputting the range.

3. The method of claim 1, wherein computing the variability estimate comprises:
   computing at least in part from the historical test results an estimate of the uncertainty of the mean;
   computing at least in part from the historical test results a within-instrument variability estimate that is an estimate of the variability of test results obtained using a single testing instrument on at least one prior lot of the quality control material; and
   computing at least in part from the historical test results a between-instrument variability estimate that is an estimate of the variability of test results obtained using different testing instruments on at least one prior lot of the quality control material;
   and wherein computing the range based at least in part on the mean and the variability estimate comprises computing the range based at least in part on the mean, the estimate of the uncertainty of the mean, the within-instrument variability estimate, and the between-instrument variability estimate.

4. The method of claim 3, further comprising:
   setting an upper limit for the percentage of the assay range that is due to uncertainty in estimating the mean; and
   establishing a sampling plan, based at least in part on the within- and between-instrument variability estimates, to achieve an assay range having a percentage of its width due to uncertainty in estimating the mean, the percentage being at or below the upper limit.

5. The method of claim 3, wherein the within-instrument variability estimate is derived from an average of variances, each variance being the variance of test results from a respective one of a plurality of instruments.

6. The method of claim 3, wherein the between-instrument variability estimate is derived from a variance of averages, each average being an average test result from a respective one of a plurality of instruments.

7. The method of claim 1, wherein the estimate of the uncertainty of the mean is a standard error of the mean, and the standard error of the mean is computed based at least in part on estimates of variability derived from the database of historical test results.

8. The method of claim 1, wherein computing the variability estimate at least in part from the historical test results comprises accounting for an observed relationship between the mean and the variability of test results.

9. The method of claim 1, wherein computing the variability estimate at least in part from the historical test results comprises:
    performing a regression using the historical test results to characterize the relationship between the mean and at least one component of the variability; and
    adjusting the variability estimate based on the mean and the relationship.

10. The method of claim 1, wherein computing the variability estimate at least in part from the historical test results comprises:
    identifying a specific prior lot of the quality control material that has a mean test result comparable to the mean computed from the test results from the particular lot of quality control material;
    computing a variability of test results obtained from tests of the specific prior lot of quality control material; and
    assigning to the particular lot of quality control material a variability estimate that is equal to the computed variability of test results from the specific prior lot of quality control material.

11. The method of claim 1, wherein computing the variability estimate comprises:
    computing at least in part from the historical test results an estimate of the uncertainty of the mean;
    computing at least in part from the historical test results a within-laboratory variability estimate that is an estimate of the variability of test results obtained within a single laboratory on at least one prior lot of the quality control material; and
    computing at least in part from the historical test results a between-laboratory variability estimate that is an estimate of the variability of test results obtained from different laboratories on at least one prior lot of the quality control material;
    and wherein computing the range based at least in part on the mean and the variability estimate comprises computing the range based at least in part on the mean, the estimate of the uncertainty of the mean, the within-laboratory variability estimate, and the between-laboratory variability estimate.

12. The method of claim 1, further comprising removing from consideration anomalous test results found in the database of historical test results.

13. A method of establishing a sampling plan for assigning an assay mean and range to a particular lot of a quality control material, the method comprising:
    setting an upper limit for the percentage of the assay range that is due to uncertainty in estimating the mean;
    accessing a database of historical test results obtained from tests performed on prior lots of the quality control material;
    computing at least in part from the historical test results a within-instrument variability estimate that is an estimate of the variability of test results obtained using a single testing instrument on at least one prior lot of the quality control material; and
    computing at least in part from the historical test results a between-instrument variability estimate that is an estimate of the variability of test results obtained using different testing instruments on at least one prior lot of the quality control material; and
    establishing a sampling plan, based at least in part on the within- and between-instrument variability estimates, to achieve an assay range having a percentage of its width due to uncertainty in estimating the mean, the percentage being at or below the upper limit.

14. The method of claim 13, further comprising testing samples from the particular lot of quality control material according to the established sampling plan.

15. A system for establishing a statistically valid assay mean and assay range for a particular lot of a quality control material, the system comprising:
    a processor;
    a database holding historical test results obtained from tests performed on prior lots of the quality control material; and
    a memory readable by the processor, the memory holding processor instructions that when executed by the processor cause the system to
    obtain a number of test results obtained from tests on a number of samples from the particular lot of the quality control material;
    compute a mean of the test results;
    access the database of historical test results obtained from tests performed on prior lots of the quality control material;
    compute at least in part from the historical test results a variability estimate that is an estimate of the variability of test results obtained from tests performed on at least one prior lot of the quality control material;
    receive a specification of a target probability with which a new qualification test result performed on a sample of the new lot of quality control material will fall within the assay range; and
    compute, based at least in part on the mean and the variability estimate, a range of test result values within which a result from a qualification test of a sample from the particular lot of the quality control material is expected to fall, with the target probability.

16. The system of claim 15, wherein the instructions, when executed by the processor to compute the variability estimate, further cause the processor to
    compute at least in part from the historical test results an estimate of the uncertainty of the mean;
    compute at least in part from the historical test results a within-instrument variability estimate that is an estimate of the variability of test results obtained using a single testing instrument on at least one prior lot of the quality control material; and
    compute at least in part from the historical test results a between-instrument variability estimate that is an estimate of the variability of test results obtained using different testing instruments on at least one prior lot of the quality control material.

17. An assay mean and range assignment system for establishing a statistically valid assay mean and assay range for a particular lot of a quality control material, the system comprising:

a database holding historical test results obtained from tests performed on prior lots of a quality control material;

a mean determination module that receives a number of test results obtained from tests on a number of samples from a new lot of the quality control material and computes a mean of the test results;

a variability estimation module that computes at least in part from the historical test results a variability estimate that is an estimate of the variability of test results obtained from tests performed on at least one prior lot of the quality control material; and a range establishment module that establishes, based at least in part on the mean and the variability estimate, a range of test result values within which a result from a qualification test of a sample from the new lot of the quality control material is expected to fall, with a target probability.

18. The system of claim 17, wherein:

the variability estimate comprises a within-instrument variability estimate that is an estimate of the variability of test results obtained using a single testing instrument on at least one prior lot of the quality control material; and the variability estimate comprises a between-instrument variability estimate that is an estimate of the variability of test results obtained using different testing instruments on at least one prior lot of the quality control material; and the system further comprises a sampling plan establishment module that establishes a sampling plan based at least in part on the within-instrument variability estimate and the between-instrument variability estimate.

19. The system of claim 18, wherein the sampling plan establishment module receives a specification of an upper limit for the percentage of the assay range that is due to uncertainty in estimating the mean, and establishes the sampling plan based at least in part on the within-instrument variability estimate, the between-instrument variability estimate, and the upper limit for the percentage of the assay range that is due to uncertainty in estimating the mean.

20. The system of claim 17, wherein the range establishment module accounts for an observed relationship between the mean and variability of historical test results.

21. The system of claim 17, wherein:

the variability estimate comprises an estimate the uncertainty of the mean;

the variability estimate comprises a within-instrument variability estimate that is an estimate of the variability of test results obtained using a single testing instrument on at least one prior lot of the quality control material;

the variability estimate comprises a between-instrument variability estimate that is an estimate of the variability of test results obtained using different testing instruments on at least one prior lot of the quality control material; and the range establishment module establishes the range based at least in part on the mean, the estimate of the uncertainty of the mean, the within-instrument variability estimate, and the between-instrument variability estimate.

* * * * *